United States Patent
Huang et al.

(10) Patent No.: US 8,700,807 B2
(45) Date of Patent: Apr. 15, 2014

(54) HIGH SPEED BASEBOARD MANAGEMENT CONTROLLER AND TRANSMISSION METHOD THEREOF

(75) Inventors: Hung-Ju Huang, Hsinchu (TW); Shu-An Huang Ho, Hsinchu (TW); Jen-Min Yuan, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 51 days.

(21) Appl. No.: 13/536,399

(22) Filed: Jun. 28, 2012

(65) Prior Publication Data

US 2013/0019030 A1  Jan. 17, 2013

(30) Foreign Application Priority Data

Jul. 11, 2011  (TW) .............................. 100124386 A

(51) Int. Cl.
*G06F 3/00* (2006.01)
*G06F 12/00* (2006.01)
*G06F 12/02* (2006.01)
*G06F 9/34* (2006.01)

(52) U.S. Cl.
USPC ................ 710/3; 710/4; 710/8; 710/9; 711/1; 711/200; 711/202; 711/217

(58) Field of Classification Search
None
See application file for complete search history.

(56) References Cited

U.S. PATENT DOCUMENTS

| | | | | |
|---|---|---|---|---|
| 5,119,080 A | * | 6/1992 | Kajimoto et al. | 345/620 |
| 5,155,822 A | * | 10/1992 | Doyle et al. | 711/202 |
| 5,444,497 A | * | 8/1995 | Takeuchi | 348/719 |
| 5,546,137 A | * | 8/1996 | Takeuchi | 348/714 |
| 6,453,278 B1 | * | 9/2002 | Favor et al. | 703/27 |
| 7,051,123 B1 | * | 5/2006 | Baker et al. | 710/22 |
| 7,548,996 B2 | * | 6/2009 | Baker et al. | 710/22 |
| 2008/0126650 A1 | * | 5/2008 | Swanson et al. | 710/267 |

* cited by examiner

*Primary Examiner* — Michael Sun
(74) *Attorney, Agent, or Firm* — Muncy, Geissler, Olds & Lowe, PLLC

(57) ABSTRACT

A baseboard management controller is disclosed. The baseboard management controller adapted to monitor a host comprises a baseboard management control module, a memory controller and a video graphic array (VGA) module. The VGA module comprises a video controller, a decoder, a select circuit and a mapping circuit. The decoder receives a transaction signal from a first local bus and decodes a first address signal contained in the transaction signal. The select circuit selectively transfers data from one of the microprocessor bus, the video controller and the memory controller back to the first local bus according to a control signal. The mapping circuit being connected with the decoder maps the first address signal and a second address signal to a third address signal, updates the first address signal and transfers an updated transaction signal.

21 Claims, 4 Drawing Sheets

HIGH SPEED BASEBOARD MANAGEMENT CONTROLLER AND TRANSMISSION METHOD THEREOF

This application claims the benefit of the filing date of Taiwan Application Ser. No. 100124386, filed on Jul. 11, 2011, the content of which is incorporated herein by reference in its entirety.

BACKGROUND OF THE INVENTION

1. Field of the Invention

The invention relates to a computer system, and more particularly to a baseboard management controller and a transmission method thereof for performing high speed data exchange with a host by means of a video graphic array (VGA) module.

2. Description of the Related Art

A baseboard management controller (BMC) is a specialized service processor that monitors the physical state of a computer, a network server or other hardware device using sensors and communicating with a system administrator through an independent connection. The BMC is part of the Intelligent Platform Management Interface (IPMI) and is usually contained in the motherboard or a main circuit board of the device to be monitored.

The sensors of a BMC measure internal physical variables such as temperature, humidity, power-supply voltage, fan speeds, communication parameters and operating system (OS) functions. If any of these variables happens to stray outside specified limits, the administrator is notified. That person can then take corrective action by remote control. The monitored device can be power cycled or rebooted if necessary. In this manner, a single administrator can remotely manage numerous servers and other devices simultaneously, saving on the overall operating cost of the network and helping to ensure its reliability.

FIG. 1 shows an interface diagram between a BMC 100 and a host 150 according to prior art. Referring to FIG. 1, conventionally, a BMC 100 is loosely coupled with a host CPU 120. The host CPU 120 accesses a shared memory or registers 101 via a chipset 122 and one of a low pin count (LPC) bus and a system management bus (SMB) 128. A microprocessor 103 of the BMC 100 also accesses the shared memory/registers 101 via a microprocessor bus 118 to thereby communicate with the host CPU 120. However, a traditional data exchange between the BMC 100 and the host CPU 120 is achieved by software handshaking and thus its data transmission efficiency is not high. It tends to spend a lot of time performing a huge volume data exchange between the BMC 100 and the host CPU 120.

Accordingly, what is needed is a baseboard management controller and a transmission method thereof to address the above-identified problems. The invention addresses such a need.

SUMMARY OF THE INVENTION

One objective of the invention is to provide a baseboard management controller that can solve the above problems in the prior art.

One embodiment of the invention provides a baseboard management controller. The baseboard management controller is used to monitor a host. The baseboard management controller comprises a baseboard management control module, a memory controller and a video graphic array (VGA) module. The baseboard management control module comprises: a microprocessor for performing data processing; at least one controller for performing management and control operations; and, a microprocessor bus being connected with the microprocessor and each of the at least one controller. The memory controller being connected with the microprocessor bus is used to control accesses of program codes and data. The VGA module comprises: a video controller being connected with the memory controller for controlling inputs, outputs and displays of video data; a decoder being connected with a first local bus of the host for receiving a transaction signal from the first local bus and decoding a first address signal contained in the transaction signal to determine whether to transfer the transaction signal, wherein the transaction signal at least comprises the first address signal and a command; a select circuit for selectively transferring data from one of the microprocessor bus, the video controller and the memory controller back to the first local bus according to a control signal; and, a mapping circuit being connected with an output port of the decoder for mapping the first address signal and a predetermined second address signal to a third address signal, updating the first address signal and transferring an updated transaction signal to the microprocessor bus; wherein when the first address signal points to an aperture allocated in a VGA section of a memory space of the host, the decoder transfers the transaction signal to the mapping circuit; wherein when the first address signal points to a frame buffer address region allocated in the VGA section, the decoder transfers the transaction signal to the memory controller; wherein when the first address signal points to a video controller address region allocated in the VGA section, the decoder transfers the transaction signal to the video controller; wherein the aperture does not overlap with the frame buffer address region and the video controller address region in the VGA section; and, wherein the predetermined second address signal points to a target block in a memory space of the microprocessor.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
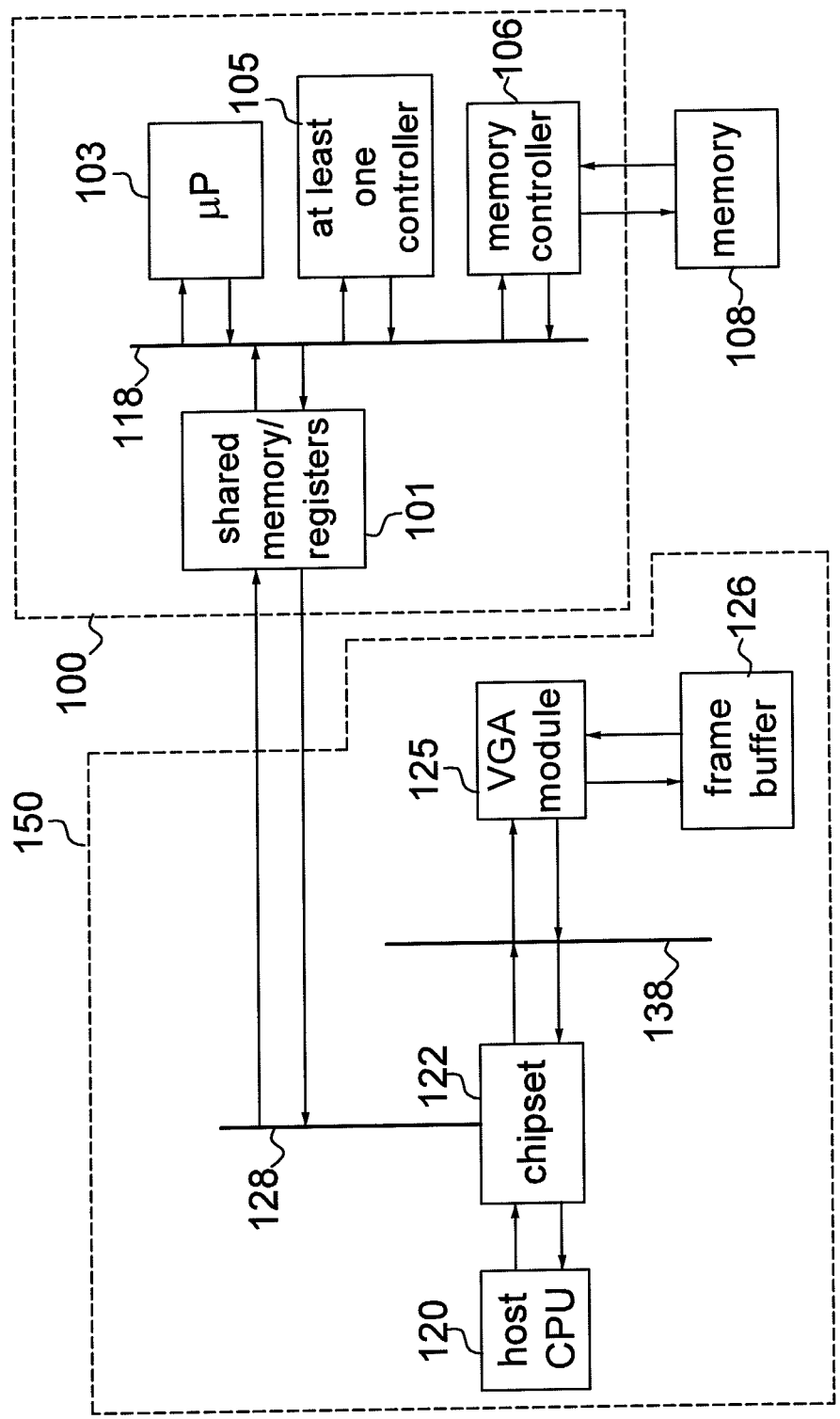
FIG. 1 shows an interface diagram between a BMC and a host according to prior art.
Figure 2:
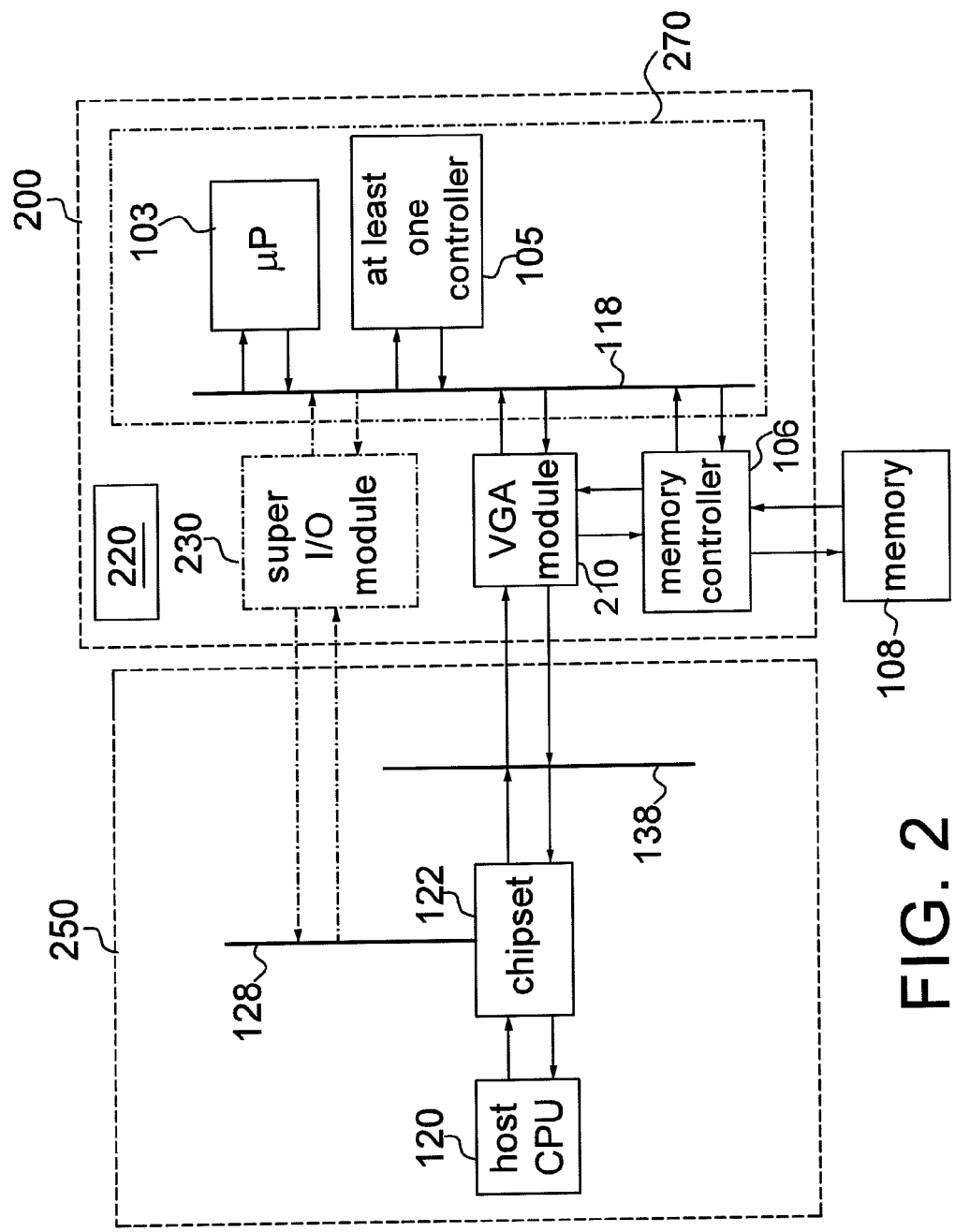
FIG. 2 is a block diagram of a BMC according to an embodiment of the invention.

FIG. 2 is a block diagram of a BMC according to an embodiment of the invention. Referring to FIG. 2, two different computer systems, a host 250 and a BMC 200, are installed on the same mother board. In this embodiment, a microprocessor 103 and a host CPU 120 respectively execute different operating systems and different application programs.

The BMC 200 of the invention includes a baseboard management control module 270, a memory controller 106, a remote keyboard video mouse switch module 220, a super I/O module 230 and a VGA module 210 with transmission function. The baseboard management control module 270 includes a microprocessor 103, at least one controller 105 and a microprocessor bus 118. The baseboard management control module 270 performs remote monitoring and control operations by means of measuring a plurality of internal physical variables of the host 250. The microprocessor 103 performs data processing while the at least one controller 105 performs a plurality of the baseboard management control operations. The microprocessor bus 118 is used to connect the microprocessor 103 and each of the at least one controller 105.

The remote keyboard video mouse switch module 220 allows users to control the host 250 and the BMC 200 via a set of keyboard, mouse and monitor. The memory 108 is used to store the programming codes and data of the microprocessor 103 and video data of the VGA module 210 with transmission function. The memory controller 106, connected to the VGA module 210 with transmission function and the microprocessor bus 118, is used to control accesses of program codes and data to the memory 108. The VGA module 210 with transmission function not only performs video data transmission and controls the video data output to a display device, such as CRT or LCD, but also transfers transaction signals on and data between the BMC 200 and the host CPU 120. The super I/O module 230, coupled between the microprocessor bus 118 and the LPC bus/SMB 128, is used to perform the data exchange between the baseboard management control module 270 and the host 250. Specifically, the host CPU 120 accesses the shared memory or registers (not shown, also called mailboxes) embedded in the super I/O module 230 via the chipset 122 and the LPC bus/SMB 128. The microprocessor 103 also accesses the shared memory or registers embedded in the super I/O module 230 via the microprocessor bus 118, thereby to communicate with the host CPU 120. Please be noted that the data transmission efficiency of the super I/O module 230 is low and thus the super I/O module 230 can be added or removed according to practical applications. Since the super I/O module 230 is optional, it is represented by dashed lines in FIG. 2.

Figure 3:
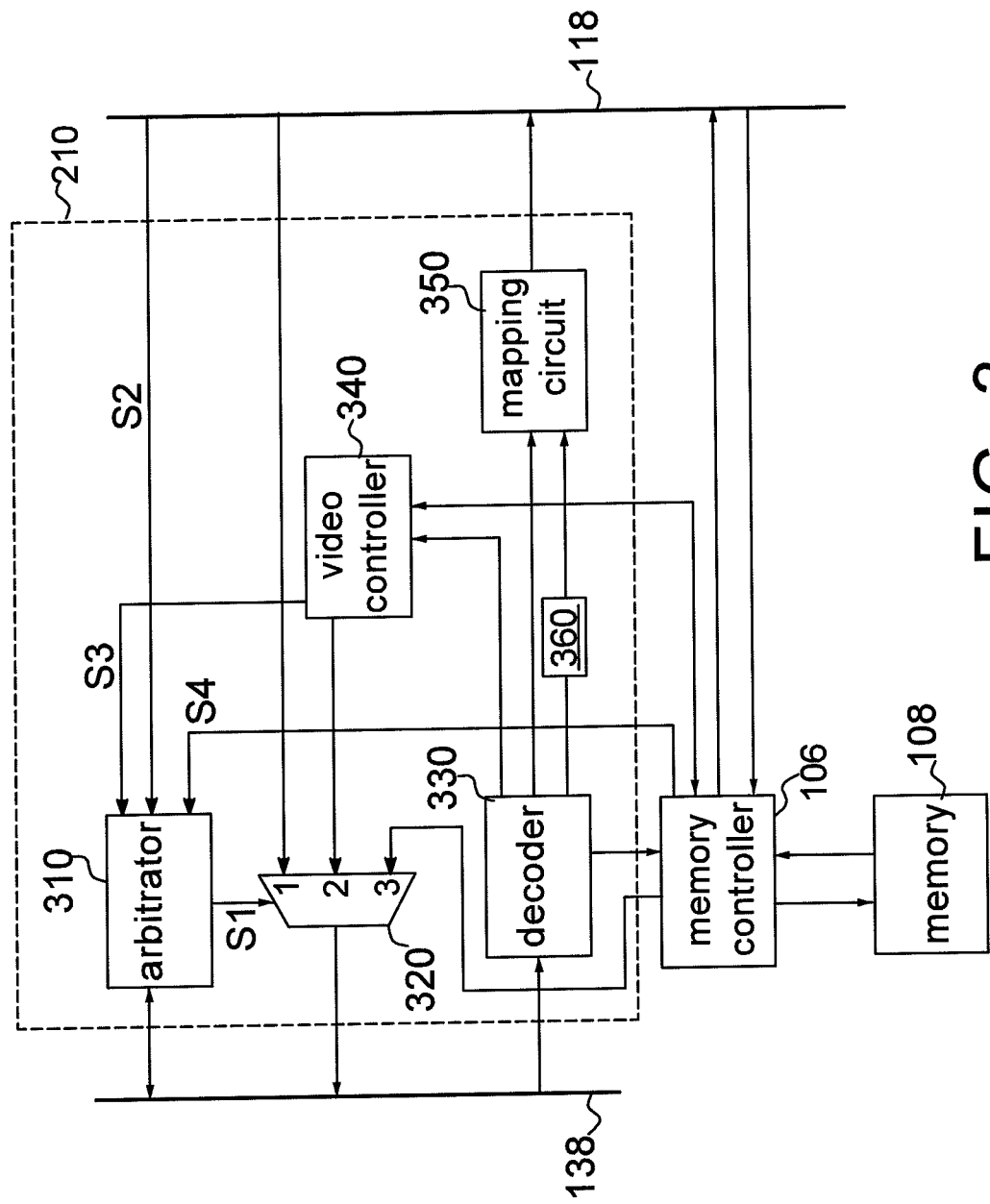
FIG. 3 is a block diagram of a VGA module with transmission function according to one embodiment of the invention

FIG. 3 is a block diagram showing a VGA module 210 with transmission function according to one embodiment of the invention. Referring to FIG. 3, the VGA module 210 with transmission function of the invention includes a decoder 330, an arbitrator 310, a multiplexer 320, a video controller 340, a mapping address register 360 and a mapping circuit 350. An input port of the decoder 330, connected to a peripheral component interconnect (PCI) bus or a PCI express bus 138, is used to receive a transaction signal and decode a first address signal contained in the transaction signal to determine whether to transfer the transaction signal. Here, the transaction signal at least includes a command and an address signal. For example, when the transaction signal is a read transaction signal, the read transaction signal only includes a read command and a read address. When the transaction signal is a write transaction signal, the write transaction signal includes a write command, a write address and at least one write datum. The video controller 340, connected to the decoder 330, the arbitrator 310, the multiplexer 320 and the memory controller 106, is used to control inputs, outputs and displays of video data. The mapping circuit 350, connected to an output port of the decoder 330, firstly maps the first address signal contained in the transaction signal and a second address signal stored in the mapping address register 360 to an output address signal. Then, according to the output address signal, the mapping circuit 350 updates the first address signal contained in the transaction signal to generate an updated transaction signal. Finally, the mapping circuit 350 transfers the updated transaction signal to the microprocessor bus 118.

The multiplexer 320 has three input ports and one output port. The first input port is connected with the microprocessor bus 118 and the second input port is connected with the video controller 340. The third input port is connected with the memory controller 106 and the output port is connected with the PCI bus 138. The multiplexer 320 connects a corresponding input port to the output port according to a control signal S1. In an alternative embodiment, the multiplexer 320 is replaced with a switch, which directs a flow from a corresponding input port to the output port according to the control signal S1. The arbitrator 310, coupled between the PCI bus 138 and the microprocessor bus 118, is used to generate the control signal S1 according to at least one of the control signals (S2/S3/S4), PCI bus requests and a priority.

Figure 4:
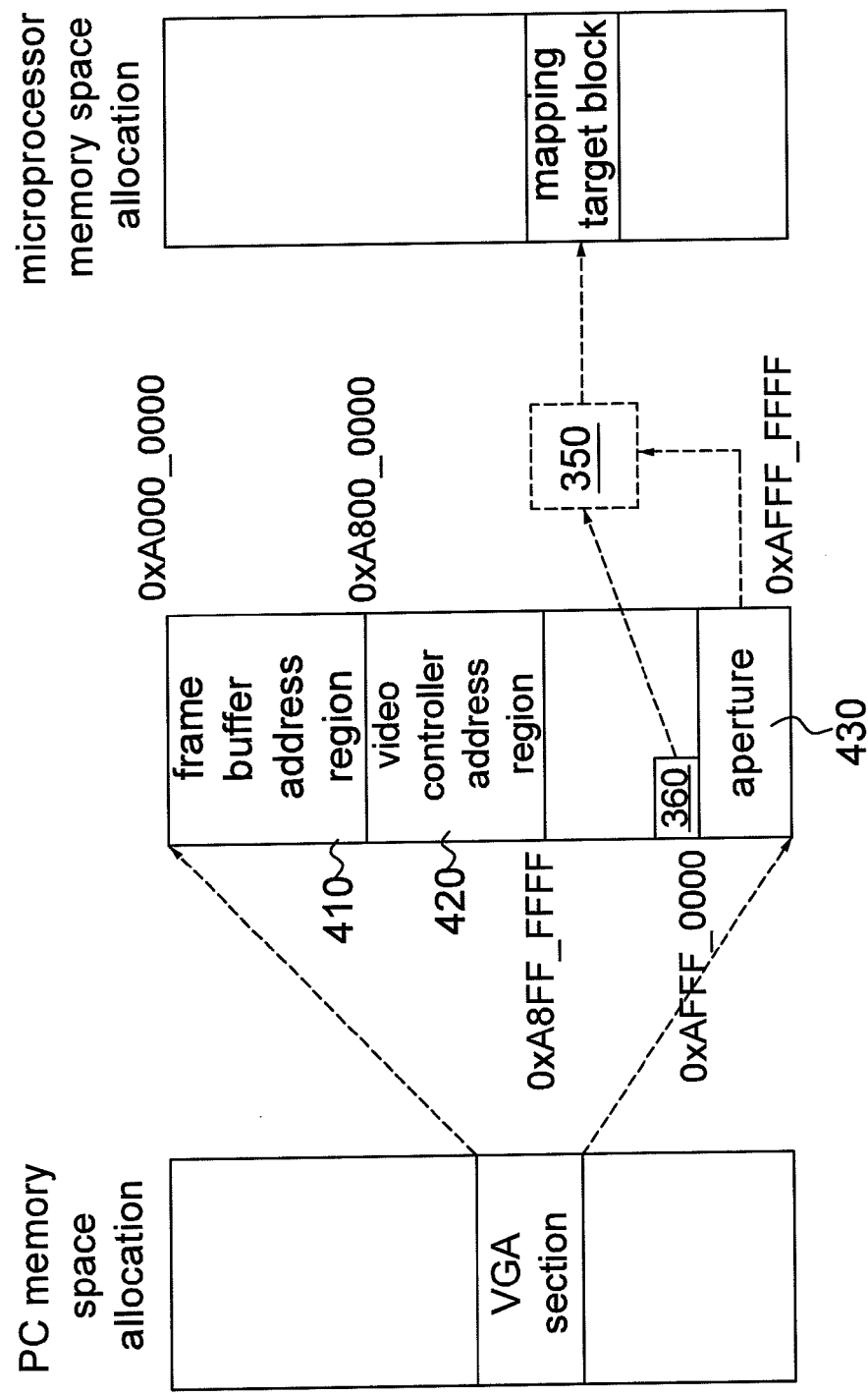
FIG. 4 is an exemplary memory mapping from a PC memory space (host 250) to a microprocessor memory space (BMC 200)

In the embodiment of FIG. 3, the mapping address register 360 is a 32-bit register allocated at PC memory address 0xAFFE_0000. FIG. 4 is an exemplary memory mapping from a PC memory space (host 250) to a microprocessor memory space (BMC 200). Hereinafter, the operations of the invention will be detailed in connection with FIG. 3 and FIG. 4. In a system memory space of a traditional host or a personal computer (PC) (hereinafter called "PC memory space"), there is a VGA section configured by a system basic input/output system (BIOS) or an operation system at startup. In the embodiment of FIG. 4, an address range from 0xA000_0000 to 0xAFFF_FFFF in the PC memory space is allocated for the VGA section. In this embodiment, an address range from 0xA000_0000 to 0xA7FF_FFFF is allocated for a frame buffer address region 410, an address range from 0xA800_0000 to 0xA8FF_FFFF is allocated for a video controller address region 420 and an address range from 0xAFFF_0000 to 0xAFFF_FFFF is allocated for an aperture 430. The size and the address range of the aperture 430 are only utilized as embodiments and are not limitations of the invention. According to the invention, the aperture 430 falls within the VGA section and does not overlap with the frame buffer address region 410 and the video controller address region 420.

The aperture 430 of the invention is regarded as a high speed transmission port. Data are capable of being rapidly transferred from the PC memory space to the microprocessor memory space via the high speed transmission port. In other words, when an access address issued by the host CPU 120 points to the aperture 430, the access address will be mapped or redirected to the microprocessor memory space, to thereby obtain a corresponding access address in the microprocessor memory space. Then, related data can be written into or read from the corresponding access address in the microprocessor memory space.

In the embodiment of FIG. 4, the mapping address register 360 is a 32-bit register allocated at PC memory address 0xAFFE_0000 and the aperture 430 has a 64K-byte memory space. According to the invention, the size of the aperture 430 is less than that of the microprocessor memory space and the whole microprocessor memory space is divided into a plurality of mapping blocks, each having the same size as the aperture 430. The mapping address register 360 determines which mapping block (hereinafter called "target block") in the microprocessor memory space the aperture 430 is mapped to. According to an access address (including a block value and an offset value) of the target block in the microprocessor memory space, the host CPU 120 stores the block value of the target block in the mapping address register 360 in advance. In an embodiment, the block value of the target block stored in the mapping address register 360 is the starting address of the target block in the microprocessor memory space.

Please be noted that installation or allocation of the mapping address register 360 is not limited to any specific address in the PC memory space. Any device in which the mapping address register 360 is located can store and update the block value of the target block without being modified by other devices and this also falls in the scope of the invention. Besides, the above block value of the target block stored in the mapping address register 360 being the starting address of the target block in the microprocessor memory space is only utilized as embodiments and is not limitation of the invention. In practice, any value in the mapping address register 360 that can identify the access address of the target block in the microprocessor memory space falls in the scope of the invention.

According to the invention, the PC memory addresses are mapped to the target block in the microprocessor memory space via the aperture 430 and thus a linear access is allowed to be performed on the target block. In other words, when the host CPU 120 issues an access address falling within the aperture 430, the access address has an offset value in the aperture 430 (in the PC memory space) equal to a corresponding offset value in the target block (in the microprocessor memory space).

Assume the host CPU 120 has 4K-byte data to be written into the address range from 0x003A_1000 to 0x003A_1FFF in the microprocessor memory space (the BMC 200). First, the host CPU 120 updates the mapping address register 360, so the mapping address register 360 stores the block value of the target block equal to 0x003A_0000. Following that, the host CPU 120 issues a write transaction signal via the PCI (or PCI-e) bus 138 and the write transaction signal includes a write starting address 0xAFFF_1000, a memory write command and at least one write datum. During a bus cycle when the PCI bus 138 issues the above write starting address, the decoder 330 of the VGA module 210 with transmission function decodes the write starting address. Since the write starting address 0xAFFF_1000 points to the aperture 430, the decoder 330 determines itself to be a target device of the PCI bus 138 and then transfers the write transaction signal to the mapping circuit 350. Meanwhile, the decoder 330 issues an enable signal to the mapping address register 360 to cause the block value (0x003A_0000) in the mapping address register 360 to be sent to the mapping circuit 350.

After receiving the above write transaction signal, the mapping circuit 350 retrieves the write starting address from the write transaction signal and then calculates the offset value (0xAFFF_1000−0xAFFF_0000=0x0000_1000) of the above write starting address. After that, the offset value is added to the block value of the target block to obtain the target write address 0x003A_1000 (=0x0000_1000+0x003A_0000) in the microprocessor memory space. Next, the mapping circuit 350 sets the write starting address contained in the write transaction signal to be 0x003A_1000 to obtain an updated write transaction signal. The mapping circuit 350 transfers the related data and the updated write transaction signal to the microprocessor bus 118. Finally, the at least one write datum is written into the address x003A_1000 in the microprocessor memory space. The preceding describes the decoder 330 and the mapping circuit 350 that transfer the related data and the updated write transaction signal to the microprocessor bus 118 and that write the related data to the starting address 0x003A_1000 in the microprocessor memory space. Then, in the same manner, the subsequent data are written into the subsequent addresses 0x003A_1001-0x003A_1FFF in the microprocessor memory space.

On the other hand, when the write address (e.g., 0xA800_3000) contained in a write transaction signal points to the video controller address region 420, the decoder 330 determines itself to be a target device of the PCI bus 138 and then transfers the write transaction signal on the PCI bus 138 to the video controller 340. Besides, when the write address (e.g., 0xA000_8000) contained in a write transaction signal falls within the frame buffer address region 410, the decoder 330 determines itself to be a target device of the PCI bus 138 and then transfers the write transaction signal to the memory controller 106. The memory controller 106 converts the memory write command contained in the write transaction signal into a frame buffer write command and then stores the related data in the memory 108. The operations and implementations of the decoder 330 that decodes the write address and that transfers the write transaction signal to both the video controller 340 and the memory controller 106 are well known to those skilled in the art and thus will not be described herein.

Assume the host CPU 120 intends to read 256-byte data from the address range of 0x7321_8000 to 0x7321_80FF in the microprocessor memory space (not shown). Please be noted that the first half of the operations of reading data from the microprocessor memory space is similar to those of writing data to a specific address in the microprocessor memory space as mentioned above. A difference is that an updated write transaction signal (including at least one write datum) is transferred to the microprocessor bus 118 when data is written to the microprocessor memory space and an updated read transaction signal is transferred to the microprocessor bus 118 when data is read from the microprocessor memory space.

After receiving the above updated read transaction signal, a corresponding memory of the BMC 200 simultaneously asserts a active-low control signal S2 (indicating the data is ready) to the arbitrator 320 while preparing to transfer the data read from the address range (from 0x7321_8000 to 0x7321_80FF) to the microprocessor bus 118. In response to the active-low control signal S2, the arbitrator 310 issues a control signal S1 to the multiplexer 320 to allow the data on the microprocessor bus 118 to be sent back to the PCI bus 138 via the first input port of the multiplexer 320. Thus, the operations of reading data from the memory in the microprocessor memory space are completed.

On the other hand, when the memory read address (e.g., 0xA800_3000), issued by the host CPU 120 via the PCI (or PCI-e) bus 138 and contained in a read transaction signal, points to the video controller address region 420, the decoder 330 determines itself to be a target device of the PCI bus 138 and then transfers the read transaction signal from the PCI bus 138 to the video controller 340. After receiving the read transaction signal, the video controller 340 simultaneously asserts a control signal S3 (indicating the data is ready) to the arbitrator 320 while preparing to send the data read from the address 0xA800_3000 to the second input port of the multiplexer 320. Then, the arbitrator 310 issues a corresponding control signal S1 to the multiplexer 320 to allow the data at the second input port of the multiplexer 320 to be sent back to the PCI bus 138 via the multiplexer 320. Thus, the operations of reading data from the video controller 340 are completed. When the memory read address (e.g., 0xA000_5000), issued by the host CPU 120 via the PCI (or PCI-e) bus 138 and contained in a read transaction signal, points to the frame buffer address region 410, the decoder 330 determines itself to be a target device of the PCI bus 138 and then transfers the read transaction signal to the memory controller 106. Next, the memory controller 106 converts the memory read command contained in the read transaction signal into a corresponding frame buffer read command for reading the memory 108. The memory controller 106 simultaneously asserts a control signal S4 (indicating the data is ready) to the arbitrator 320 while preparing to transfer the data read from the address 0xA000_5000 to the third input port of the multiplexer 320. Then, the arbitrator 310 issues a corresponding control signal S1 to the multiplexer 320 to allow the data at the third input port of the multiplexer 320 to be sent back to the PCI bus 138 via the multiplexer 320. Thus, the operations of reading data from the memory 108 are completed.

In a case that the microprocessor 103, the video controller 340 and the memory controller 106 intend to transfer transaction signals or/and data to the PCI bus 138 at the same time, the three devices will respectively issue three bus requests (not shown) to the PCI bus 138 in advance. According to the three bus requests and a priority, the arbitrator 310 responds by sending a bus grant signal (not shown) to a device with a first priority and then issues a corresponding control signal S1 to connect a corresponding input port of the multiplexer 320 with its output port. Assume the microprocessor 103 is the first priority device, the video controller 340 is the second priority device and the memory controller 106 is the third priority device. When the microprocessor 103, the video controller 340 and the memory controller 106 simultaneously issue three bus requests to the PCI bus 138, the arbitrator 310 asserts a bus grant signal to the microprocessor controller 103 with the first priority and simultaneously issues a corresponding control signal S1 to connect the first input port of the multiplexer 320 with the output port. When the microprocessor 103 finishes transferring the data to the PCI bus 138, the arbitrator 310 de-asserts the bus grant signal to the microprocessor 103. Then, the arbitrator 310 asserts another bus grant signal to the video controller 340 with the second priority and simultaneously issues a corresponding control signal S1 to connect the second input port of the multiplexer 320 with the output port, thereby to complete data transfer from video controller 340 to the PCI bus 138. In the same manner, the memory controller 106 with the third priority also completes the data transfer operations to the PCI bus 138. Certainly, if only one of the microprocessor 103, the video controller 340 and the memory controller 106 intends to transfer a transaction signal or/and data to the PCI bus 138, the only one device will issue a bus request (not shown) to the PCI bus 138 in advance. In response to the bus request, the arbitrator 310 asserts the bus grant signal to the only one device and then issues a corresponding control signal S1 to connect a corresponding input port of the multiplexer 320 with the output port, thereby to complete the data transfer to the PCI bus 138.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A baseboard management controller for monitoring a host, comprising:
   a baseboard management control module comprising:
      a microprocessor for performing data processing;
      at least one controller for performing management and control operations; and
      a microprocessor bus being connected with the microprocessor and each of the at least one controller;
   a memory controller being connected with the microprocessor bus for controlling accesses of program codes and data; and
   a video graphic array (VGA) module comprising:
      a video controller being connected with the memory controller for controlling inputs, outputs and displays of video data;
      a decoder being connected with a first local bus of the host for receiving a transaction signal from the first local bus and decoding a first address signal contained in the transaction signal to determine whether to transfer the transaction signal, wherein the transaction signal at least comprises the first address signal and a command;
      a select circuit for selectively transferring data from one of the microprocessor bus, the video controller and the memory controller back to the first local bus according to a control signal; and
      a mapping circuit being connected with an output port of the decoder for mapping the first address signal and a predetermined second address signal to a third address signal, updating the first address signal and transferring an updated transaction signal to the microprocessor bus;
   wherein when the first address signal points to an aperture allocated in a VGA section of a memory space of the host, the decoder transfers the transaction signal to the mapping circuit;
   wherein when the first address signal points to a frame buffer address region allocated in the VGA section, the decoder transfers the transaction signal to the memory controller;
   wherein when the first address signal points to a video controller address region allocated in the VGA section, the decoder transfers the transaction signal to the video controller;
   wherein the aperture does not overlap with the frame buffer address region and the video controller address region in the VGA section; and
   wherein the predetermined second address signal points to a target block in a memory space of the microprocessor.

2. The baseboard management controller of claim 1, wherein the first local bus is one of a peripheral component interconnect (PCI) bus and a PCI express bus.

3. The baseboard management controller of claim 1, wherein the VGA module further comprises:
   an arbitrator being coupled between the first local bus and the microprocessor bus for generating the control signal.

4. The baseboard management controller of claim 3, wherein when one of the video controller, the microprocessor and the memory controller intends to transfer at least one transaction signal to the first local bus, the arbitrator generates the control signal according to a corresponding bus request.

5. The baseboard management controller of claim 3, wherein when at least two of the video controller, the microprocessor and the memory controller intend to transfer at least one transaction signal to the local bus at the same time, the arbitrator generates a corresponding bus grant signal and the control signal according to a priority.

6. The baseboard management controller of claim 3, wherein the arbitrator is further coupled between the video controller and the memory controller; and
wherein when one of the video controller, the microprocessor and the memory controller receives a memory read command for sending data back, the arbitrator generates the control signal according to a corresponding data-ready signal.

7. The baseboard management controller of claim 1, further comprising:
a super I/O module being connected between the microprocessor bus and a second local bus of the host for performing data exchange between the baseboard management control module and the host.

8. The baseboard management controller of claim 7, wherein the second local bus is one of low pin count (LPC) bus and system management bus (SMB).

9. The baseboard management controller of claim 1, wherein the select circuit is one of a multiplexer and a switch.

10. The baseboard management controller of claim 1, further comprising: a memory being connected with the memory controller for storing program codes and data.

11. The baseboard management controller of claim 1, wherein a size of the aperture is equal to that of the target block.

12. The baseboard management controller of claim 1, wherein the predetermined second address signal is a starting address of the target block; and, wherein a first offset value associated with the first address signal in the aperture is equal to a second offset value associated the third address signal in the target block.

13. The baseboard management controller of claim 1, wherein the video graphic array (VGA) module further comprises:
a mapping address register allocated at a specified address in the VGA section for storing the predetermined second address signal;
and, wherein the specified address does not fall within the frame buffer address region, the video controller address region and the aperture of the VGA section.

14. The baseboard management controller of claim 1, being integrated with the host on a same motherboard.

15. A transmission method applied in a baseboard management controller at least comprising a baseboard management control module and a video graphic array (VGA) module, the baseboard management control module at least comprising a microprocessor and a microprocessor bus, the method performing data exchange between a host and the baseboard management control module by means of the VGA module, the method comprising:
issuing a transaction signal by means of a local bus of the host, the transaction signal at least comprising a first address signal and a command;
decoding the first address signal to determine whether the first address signal points to an aperture of a VGA section in a memory space of the host;
mapping the first address signal and a predetermined second address signal to a third address signal when the first address signal points to the aperture;
updating the first address signal according to the third address signal to obtaining an updated transaction signal; and
transferring the updated transaction signal to the microprocessor bus;
wherein the aperture does not overlap with a frame buffer address region and a video controller address region of the VGA section; and
wherein the predetermined second address signal points to a target block allocated in a memory space of the microprocessor.

16. The transmission method of claim 15, further comprising:
sending data read from the microprocessor memory space back to the local bus by means of a select circuit according to a corresponding data-ready signal when the command is a memory read command.

17. The transmission method of claim 15, wherein the predetermined second address signal is stored in a specified address in the VGA section of the host memory space; and wherein the specified address does not fall within the frame buffer address region, the video controller address region and the aperture of the VGA section.

18. The transmission method of claim 15, wherein a size of the aperture is equal to that of the target block.

19. The transmission method of claim 18, wherein the predetermined second address signal is a starting address of the target block, and wherein a first offset value associated with the first address signal in the aperture is equal to a second offset value associated the third address signal in the target block.

20. The transmission method of claim 15, wherein the local bus is one of a peripheral component interconnect (PCI) bus and a PCI express.

21. The transmission method of claim 15, wherein when the command is a memory write command, the transaction signal further comprises at least one datum, further comprising:
writing the at least one datum into the microprocessor memory space according to the first address signal contained in the updated transaction signal.

* * * * *